United States Patent
Tsuji et al.

(10) Patent No.: US 10,344,641 B2
(45) Date of Patent: Jul. 9, 2019

(54) EXHAUST GAS PURIFYING CATALYST

(71) Applicants: CATALER CORPORATION, Kakegawa-shi, Shizuoka-ken (JP); TOYOTA JIDOSHA KABUSHIKI KAISHA, Toyota-shi, Aichi-ken (JP)

(72) Inventors: Makoto Tsuji, Kakegawa (JP); Hiroto Imai, Kakegawa (JP); Shintaro Kobayashi, Kakegawa (JP); Yusuke Shimmyo, Nagoya (JP); Hiroyuki Matsubara, Miyoshi (JP)

(73) Assignees: CATALER CORPORATION, Kakegawa-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/912,676

(22) Filed: Mar. 6, 2018

(65) Prior Publication Data
US 2018/0258810 A1    Sep. 13, 2018

(30) Foreign Application Priority Data
Mar. 9, 2017 (JP) ................. 2017-045316

(51) Int. Cl.
*F01N 3/035* (2006.01)
*B01D 53/94* (2006.01)
(Continued)

(52) U.S. Cl.
CPC ......... *F01N 3/035* (2013.01); *B01D 53/9418* (2013.01); *B01J 29/723* (2013.01);
(Continued)

(58) Field of Classification Search
CPC ...... F01N 3/2066; F01N 3/035; F01N 3/2084; F01N 2250/02; B01D 2255/50
(Continued)

(56) References Cited

U.S. PATENT DOCUMENTS 8,617,476 B2 * 12/2013 Ogyu ................. B01D 46/2429
                                                422/180
2007/0048494 A1 * 3/2007 Miyairi .............. B01D 39/2051
                                                428/116
(Continued)

FOREIGN PATENT DOCUMENTS

DE    10-2009-051875 A1    8/2010
EP    2 324 904 A2    5/2011
(Continued)

OTHER PUBLICATIONS

Jul. 23, 2018 Office Action issued in European Patent Application No. 18159872.3.
(Continued)

*Primary Examiner* — Tom P Duong
(74) *Attorney, Agent, or Firm* — Oliff PLC

(57) ABSTRACT

An exhaust gas purifying catalyst includes an inlet-side catalyst layer formed on an inner side of the partition wall from a surface of the partition wall in contact with an inlet-side cell and formed along an extension direction from an end portion on the exhaust gas inflow side, and an outlet-side catalyst layer formed on the inner side of the partition wall from a surface of the partition wall in contact with an outlet-side cell and formed along the extension direction from an end portion on the exhaust gas outflow side. Here, a sum of the lengths of the inlet-side catalyst layer and the outlet-side catalyst layer is larger than the entire length of the partition wall, and a total amount of an SCR catalyst body present in the outlet-side catalyst layer is larger than a total amount of an SCR catalyst body present in the inlet-side catalyst layer.

16 Claims, 5 Drawing Sheets

(51) Int. Cl.
  *B01J 29/72* (2006.01)
  *F01N 3/20* (2006.01)
  *F01N 3/08* (2006.01)
  *B01J 23/56* (2006.01)

(52) U.S. Cl.
  CPC ......... *F01N 3/0814* (2013.01); *F01N 3/2066* (2013.01); *B01D 2251/2067* (2013.01); *B01D 2255/20761* (2013.01); *B01D 2255/50* (2013.01); *B01D 2255/9022* (2013.01); *B01D 2255/9155* (2013.01); *B01D 2258/012* (2013.01); *B01J 23/56* (2013.01); *F01N 2250/02* (2013.01); *F01N 2370/04* (2013.01); *F01N 2610/02* (2013.01); *Y02T 10/24* (2013.01)

(58) Field of Classification Search
  USPC .................................................. 422/177, 180
  See application file for complete search history.

(56) References Cited

U.S. PATENT DOCUMENTS

| | | |
|---|---|---|
| 2007/0224093 A1 | 9/2007 | Miyairi et al. |
| 2009/0087365 A1 | 4/2009 | Klingmann et al. |
| 2010/0115930 A1 | 5/2010 | Brown et al. |
| 2011/0274601 A1 | 11/2011 | Boorse |
| 2012/0186229 A1 | 7/2012 | Phillips et al. |
| 2015/0059321 A1 | 3/2015 | Nakayama et al. |
| 2015/0078966 A1 | 3/2015 | Okajima et al. |
| 2016/0045868 A1* | 2/2016 | Sonntag ............... B01J 35/0006 423/213.2 |
| 2016/0279571 A1 | 9/2016 | Tsuji et al. |
| 2016/0367941 A1* | 12/2016 | Gilbert ............... B01D 53/9468 |
| 2017/0087541 A1* | 3/2017 | Andersen ........... B01D 53/8628 |
| 2018/0111089 A1* | 4/2018 | Li ...................... B01D 53/9418 |

FOREIGN PATENT DOCUMENTS

| | | |
|---|---|---|
| EP | 2 489 844 A1 | 8/2012 |
| EP | 3081777 A1 | 10/2016 |
| JP | 2006-520264 A | 9/2006 |
| JP | 2007-285295 A | 11/2007 |
| JP | 2009-082915 A | 4/2009 |
| JP | 2009-522094 A | 6/2009 |
| JP | 2011-104524 A | 6/2011 |
| JP | 2014-515445 A | 6/2014 |
| JP | 5787031 B2 | 9/2015 |
| JP | 2016002534 A | 1/2016 |
| WO | 2004/079167 A1 | 9/2004 |
| WO | 2007/077462 A1 | 7/2007 |
| WO | 2012/135871 A1 | 10/2012 |
| WO | 2013/172128 A1 | 11/2013 |
| WO | 2015087816 A1 | 6/2015 |
| WO | 2016/011366 A1 | 1/2016 |
| WO | 2016/160988 A1 | 10/2016 |

OTHER PUBLICATIONS

Nov. 28, 2018 Office Action issued in Australian Patent Application No. 2018201373.
Jan. 31, 2019 Office Action issued in Japanese Patent Application No. 2017-045316.

\* cited by examiner

[Fig. 1]
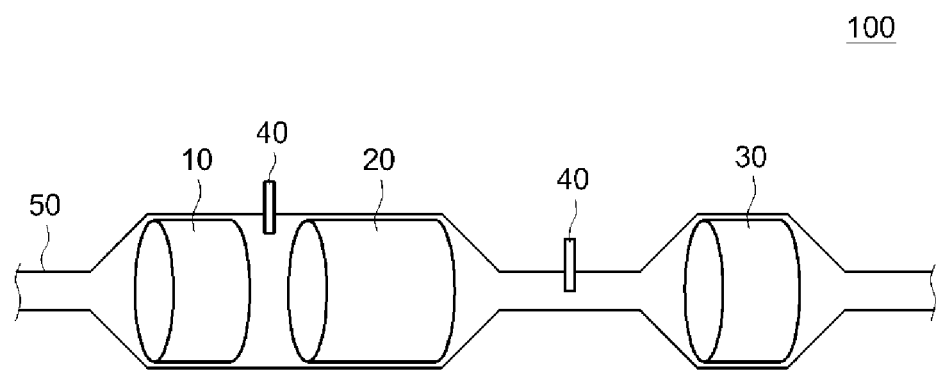

[Fig. 2]
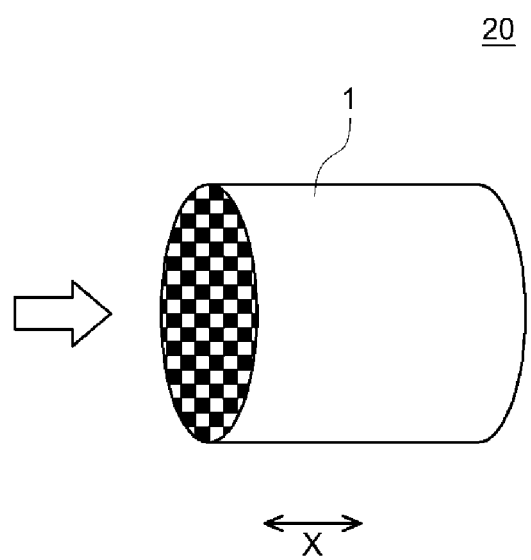

[Fig. 3]
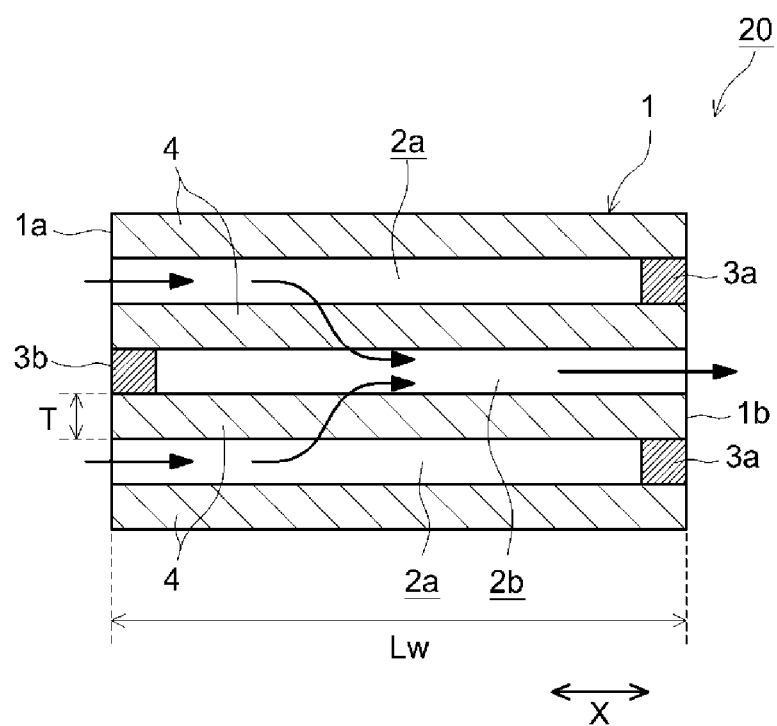

[Fig. 4]
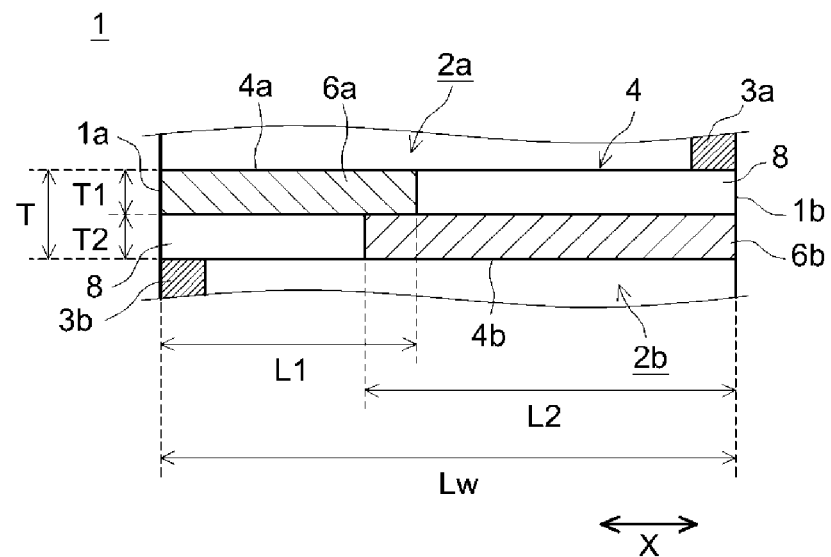
[Fig. 5]
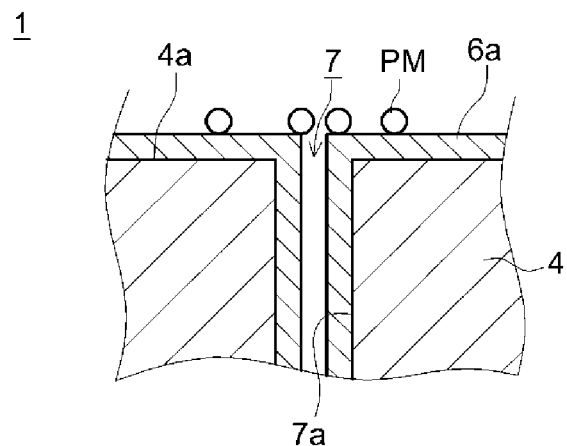

[Fig. 6]
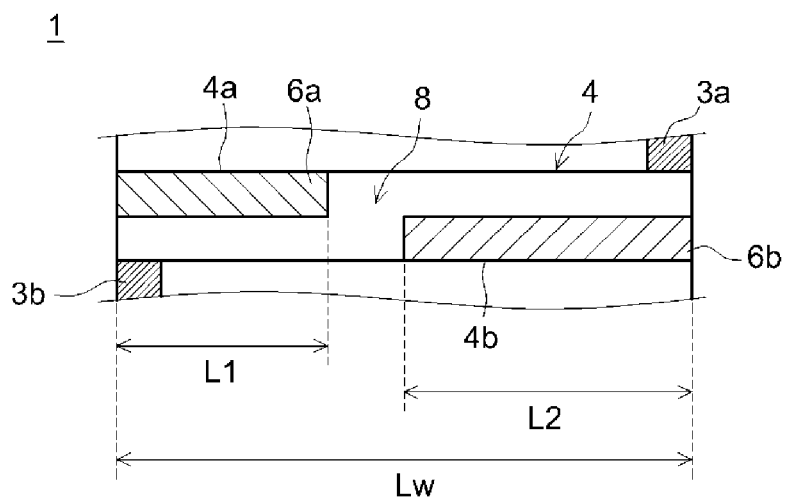
[Fig. 7]
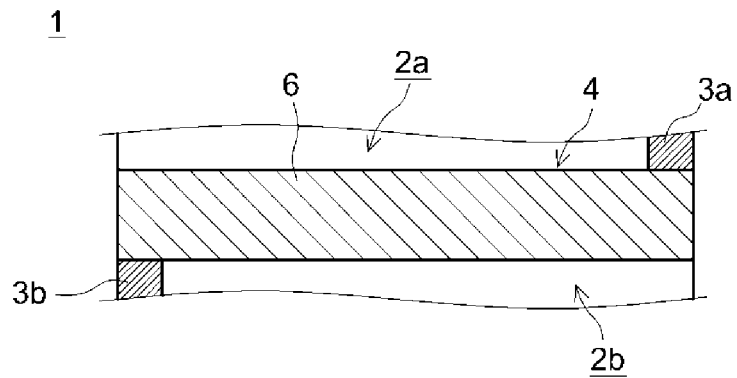

EXHAUST GAS PURIFYING CATALYST

CROSS-REFERENCE

This application claims priority based on Japanese Patent Application No. 2017-45316 filed on Mar. 9, 2017, the entire contents of which are incorporated herein by reference.

BACKGROUND OF THE INVENTION

1. Field of the Invention

The present invention relates to an exhaust gas purifying catalyst to be provided in an exhaust pipe of an internal combustion engine. More specifically, the present invention relates to an exhaust gas purifying catalyst of wall flow type for use in an SCR type purification device.

2. Description of the Related Art

Harmful components such as particulate matter (PM), hydrocarbons (HC), carbon monoxide (CO) and nitrogen oxides (NOx) are contained in exhaust gas discharged from internal combustion engines such as automobile engines. Among the abovementioned harmful components, NOx is contained in the exhaust gas discharged from diesel engines, and a selective catalytic reduction (SCR) type purification device capable of selectively purifying this NOx is installed in an exhaust pipe of an internal combustion engine.

The SCR type purification device is provided with a reducing agent supply unit and an exhaust gas purifying catalyst. After the reducing agent (for example, urea) has been supplied to the exhaust gas discharged from the internal combustion engine, the exhaust gas mixed with the reducing agent is passed through the exhaust gas purifying catalyst. A catalyst layer containing an SCR catalyst body is formed inside such an exhaust gas purifying catalyst, and the reducing agent adsorbed on the SCR catalyst body is reacted with NOx in the exhaust gas by the catalytic action of the SCR catalyst body, thereby purifying the NOx in the exhaust gas. For example, Japanese Patent No. 5787031 discloses a technique relating to such an SCR type purification device.

An exhaust gas purifying catalyst used in the SCR type purification device described above is exemplified by an exhaust gas purifying catalyst of wall flow type such as described in Japanese Patent Application Publication No. 2009-82915. The exhaust gas purifying catalyst of wall flow type includes a base of a wall flow structure having inlet-side cells (inlet-side flow paths) where only an end portion on an exhaust gas inflow side is open, outlet-side cells (outlet-side flow paths) where only an end portion on an exhaust gas outflow side is open, and porous partition walls (rib walls) partitioning these cells, and a catalyst layer including an SCR catalyst body is formed in the partition walls of the base.

In such an exhaust gas purifying catalyst of wall flow type, the exhaust gas flowing into the inlet-side cells passes through the porous partition walls and comes into contact with the catalyst layer formed in the partition walls, then flows out to the outlet-side cells and is discharged to the outside of the exhaust gas purifying catalyst. As a result, the exhaust gas mixed with the reducing agent contacts the SCR catalyst body in the catalyst layer, and NOx is purified by the abovementioned SCR reaction.

SUMMARY OF THE INVENTION

However, a problem arising when the exhaust gas purifying catalyst of wall flow type is used in the SCR type purification device in the above-described manner is that a loss of pressure (hereinafter also referred to as "pressure loss") in the exhaust gas purifying catalyst caused by the accumulation of particulate matter (PM) rises and the flow rate of the exhaust gas decreases in a short period of time. For this reason, in recent years, it has been desired to develop a technique capable of appropriately suppressing the increase in pressure drop when an exhaust gas purifying catalyst of wall flow type is used in an SCR type purification device.

The present invention has been created to solve the above problem, and it is an object of the present invention to provide an exhaust gas purifying catalyst of wall flow type capable of appropriately suppressing the increase in pressure loss when the catalyst is used in an SCR type purification device.

In order to achieve the above object, the present invention provides an exhaust gas purifying catalyst of the below-described configuration.

The exhaust gas purifying catalyst disclosed herein is an exhaust gas purifying catalyst of wall flow type which is disposed in an exhaust pipe of an internal combustion engine and performs purification of exhaust gas by reacting exhaust gas discharged from the internal combustion engine with a reducing agent.

Such an exhaust gas purifying catalyst includes: a base of a wall flow structure having an inlet-side cell where only an end portion on an exhaust gas inflow side is open, an outlet-side cell which is adjacent to the inlet-side cell and where only an end portion on an exhaust gas outflow side is open, the base further having a porous partition wall partitioning the inlet-side cell and the outlet-side cell; an inlet-side catalyst layer which is formed with a predetermined thickness on the inner side of the partition wall from the surface of the partition wall in contact with the inlet-side cell and which is formed with a predetermined length along an extension direction of the partition wall from the vicinity of the end portion on the exhaust gas inflow side, the inlet-side catalyst layer including an SCR catalyst of a substance which adsorbs a reducing agent and purifies NOx in the exhaust gas; and an outlet-side catalyst layer which is formed with a predetermined thickness on the inner side of the partition wall from the surface of the partition wall in contact with the outlet-side cell and which is formed with a predetermined length along an extension direction of the partition wall from the vicinity of the end portion on the exhaust gas outflow side, the outlet-side catalyst layer including an SCR catalyst of a substance which purifies NOx.

In the exhaust gas purifying catalyst, a sum of the length of the inlet-side catalyst layer and the length of the outlet-side catalyst layer in the extension direction is larger than the entire length of the partition wall in the extension direction, and a total amount of the SCR catalyst body present in the outlet-side catalyst layer is larger than the total amount of the SCR catalyst body present in the inlet-side catalyst layer.

As a result of extensive research conducted to solve the abovementioned problem, the inventor of the present invention has found that when an exhaust gas purifying catalyst of wall flow type is used in an SCR type purification device, particulate matter (PM) enters fine pores of porous partition walls, and the pores of the partition walls are clogged by the PM, and it has been found to cause a significant increase in pressure loss.

More specifically, in a general exhaust gas purifying catalyst, a noble metal catalyst body such as Pt is contained in the catalyst layer, and PM can be easily burned under the effect of the noble metal catalyst body. Therefore, it is possible to remove the PM which has entered the partition wall and to suppress the increase in the pressure loss to a relatively small amount.

However, where the above-described noble metal catalyst body is used in an exhaust gas purifying catalyst for an SCR type purification device, the reducing agent in the exhaust gas is burned out by the catalytic action of the noble metal catalyst body, making it impossible to purify NOx. Therefore, the noble metal catalyst body cannot be used for the exhaust gas purifying catalyst of the SCR type purification device, the PM which has entered the partition wall is hardly burned, the pores of the partition walls are clogged by the PM, and significant increase in pressure loss can be expected.

In view of this, the inventor of the present invention conducted various studies under an assumption that it is necessary to prevent the entry of PM into the partition walls in order to suppress a significant increase in pressure loss of the SCR type purification device. As a result, it was found that the increase in pressure loss due to the entry of PM into the partition walls can be suppressed by forming an inlet-side catalyst layer which is formed with a predetermined thickness on the inner side of the partition wall from the surface of the partition wall in contact with the inlet-side cell and which is formed with a predetermined length along the extension direction of the partition wall from the vicinity of the end portion on the exhaust gas inflow side, as in the exhaust gas purifying catalyst disclosed herein.

In the following description, for convenience, the region where the above-described inlet-side catalyst layer is formed is referred to as "inlet-side region".

Specifically, when the inlet-side catalyst layer is formed as in the exhaust gas purifying catalyst disclosed herein, the pore diameter of the partition wall in the inlet-side region where such inlet-side catalyst layer is formed is reduced, making it difficult for PM to enter the inside of the partition wall. As a result, PM in the exhaust gas is trapped on the surface of the partition wall in the inlet-side region which is in contact with the inlet-side cell, so that the increase in pressure loss caused by PM entering the inside of the partition wall can be suppressed.

As a result of further investigation, the inventor of the present invention has found that the specific feature of the inlet-side catalyst layer formed in the partition wall of the inlet-side region is that NOx purification rate is likely to decrease. The present invention has been accomplished as a result of finding means making it possible to maintain a sufficient NOx purification rate of the exhaust gas purifying catalyst as a whole even if the NOx purification rate in the inlet-side catalyst layer decreases.

Specifically, as described above, when the inlet-side catalyst layer is formed at the partition wall in the inlet-side region, most of the PM in the exhaust gas is trapped on the surface of the partition wall in the inlet-side region. Therefore, when purification of the exhaust gas is continued, gas diffusivity in the inlet-side region is rapidly decreased by the trapped PM. As a result, the NOx purification rate is likely to decrease.

The inventor of the present invention has studied means making it possible to maintain a high NOx purification rate in the exhaust gas purifying catalyst as a whole despite such a decrease in the NOx purification rate caused by reduction in gas diffusivity.

As a result, the inventor came up with an idea of forming an outlet-side catalyst layer which is formed with a predetermined thickness on the inner side of the partition wall from the surface of the partition wall in contact with the outlet-side cell and which is formed with a predetermined length along the extension direction of the partition wall from the vicinity of the end portion on the exhaust gas outflow side, and making the total amount of the SCR catalyst body present in the outlet-side catalyst layer larger than the total amount of the SCR catalyst body present in the inlet-side catalyst layer, as in the exhaust gas purifying catalyst disclosed herein. In the following description, for convenience, the region where the above-described outlet-side catalyst layer is formed is referred to as "outlet-side region".

By contrast with the above-described inlet-side region, the outlet-side region in which the outlet-side catalyst layer is formed is a region into which exhaust gas including a large amount of PM is unlikely to be supplied. In the exhaust gas purifying catalyst disclosed herein, NOx purification is performed with high efficiency as a result of forming a catalyst layer (outlet-side catalyst layer) in the outlet-side region and increasing the total amount of the SCR catalyst body present in the outlet-side catalyst layer. As a consequence, a high NOx purification rate can be exhibited in the outlet-side region of the exhaust gas purifying catalyst, so that it is possible to maintain a high NOx purification rate of the exhaust gas purifying catalyst as a whole.

As described above, in the exhaust gas purifying catalyst disclosed herein, by forming the inlet-side catalyst layer in the partition wall in the inlet-side region, it is possible to appropriately suppress the significant increase in pressure loss caused by PM entering the inside of the partition wall, and by forming the outlet-side catalyst layer including the SCR catalyst body in an amount larger than that in the inlet-side catalyst layer in the partition wall in the outlet-side region, it is possible to maintain a high NOx purification rate of the exhaust gas purifying catalyst as a whole.

In the exhaust gas purifying catalyst having the inlet-side catalyst layer and the outlet-side catalyst layer described hereinabove, when a region where no catalyst layer is formed (catalyst non-formation region) is present between the inlet-side catalyst layer and the outlet-side catalyst layer, the NOx purification rate may be greatly decreased since NOx in the exhaust gas that has passed through the catalyst non-formation region cannot be purified.

Therefore, in the exhaust gas purifying catalyst disclosed herein, the sum of the length of the inlet-side catalyst layer and the length of the outlet-side catalyst layer in the extension direction is made larger than the entire length of the partition wall in the extension direction, so that no catalyst non-formation region is present between the inlet-side catalyst layer and the outlet-side catalyst layer.

In a preferred embodiment of the exhaust gas purifying catalyst disclosed herein, the thickness of the outlet-side catalyst layer is larger than the thickness of the inlet-side catalyst layer.

As described above, in the exhaust gas purifying catalyst disclosed herein, the state with a high NOx purification rate of the catalyst as a whole is maintained by increasing the total amount of the SCR catalyst body present in the outlet-side catalyst layer over the total amount of the SCR catalyst body present in the inlet-side catalyst layer, and making the thickness of the outlet-side catalyst layer larger than the thickness of the inlet-side catalyst layer is one of the means for making the total amount of the SCR catalyst body present in the outlet-side catalyst layer larger than that in the inlet-side catalyst layer.

In a preferred embodiment of the exhaust gas purifying catalyst disclosed herein, the thickness of the outlet-side catalyst layer is 50% or more and 80% or less and the thickness of the inlet-side catalyst layer is 20% or more and 50% or less when an average thickness of the partition wall from the surface in contact with the inlet-side cell to the surface in contact with the outlet-side cell is 100%.

In the case where the thickness of the outlet-side catalyst layer is made larger than the thickness of the inlet-side catalyst layer, it is preferable that the thickness of the outlet-side catalyst layer be 50% or more and 80% or less and the thickness of the inlet-side catalyst layer be 20% or more and 50% or less when the thickness of the partition wall (the average thickness of the partition wall from the surface in contact with the inlet-side cell to the surface in contact with the outlet-side cell) is 100%. As a result, sufficient NOx purification capability of the outlet-side catalyst layer can be ensured.

In a preferred embodiment of the exhaust gas purifying catalyst disclosed herein, the length of the outlet-side catalyst layer is larger than the length of the inlet-side catalyst layer in the extension direction.

Another example of the means for making the total amount of SCR catalyst body in the outlet-side catalyst layer larger than that in the inlet-side catalyst layer is to increase the length of the outlet-side catalyst layer over that of the inlet-side catalyst layer. In this case, the total amount of the SCR catalyst body in the outlet-side catalyst layer can also be made larger than that in the inlet-side catalyst layer.

In a preferred embodiment of the exhaust gas purifying catalyst disclosed herein, the length of the outlet-side catalyst layer is 60% or more and 95% or less and the length of the inlet-side catalyst layer is 10% or more and 50% or less when the total length of the partition wall in the extension direction is 100%.

In the case where the length of the outlet-side catalyst layer is made larger than the length of the inlet-side catalyst layer, as in the above-described embodiment, it is preferable that the length of the outlet-side catalyst layer be made 60% or more and 95% or less and the length of the inlet-side catalyst layer be made 10% or more and 50% or less when the total length of the partition wall is 100%. As a result, sufficient NOx purification capability of the outlet-side catalyst layer can be ensured.

In a preferred embodiment of the exhaust gas purifying catalyst disclosed herein, the content of the SCR catalyst body per unit volume of the outlet-side catalyst layer is larger than the content of the SCR catalyst body per unit volume of the inlet-side catalyst layer.

In each of the embodiments described hereinabove, the total amount of the SCR catalyst body in the outlet-side catalyst layer is made larger than that in the inlet-side catalyst layer by adjusting the thickness or length of each catalyst layer to make the volume of the outlet-side catalyst layer larger than that of the inlet-side catalyst layer. However, means for increasing the total amount of SCR catalyst body in the outlet-side catalyst layer over that in the inlet-side catalyst layer is not limited thereto, and as described above, the total amount of SCR catalyst body in the outlet-side catalyst layer may be also made larger than that in the inlet-side catalyst layer by adjusting the content of the SCR catalyst body per unit volume.

In a preferred embodiment of the exhaust gas purifying catalyst disclosed herein, the SCR catalyst body present in the outlet-side catalyst layer takes 60% by weight or more and 80% by weight or less when the total amount of the SCR catalyst body present inside the partition wall is 100% by weight.

When the total amount of the SCR catalyst body in the outlet-side catalyst layer is made larger than that in the inlet-side catalyst layer, it is preferable that the SCR catalyst body present in the outlet-side catalyst layer take 60% by weight or more and 80% by weight or less when the total amount of the SCR catalyst body present inside the partition wall is 100% by weight. As a result, sufficient NOx purification capability of the outlet-side catalyst layer can be ensured.

In a preferred embodiment of the exhaust gas purifying catalyst disclosed herein, the average pore diameter of the region where the inlet-side catalyst layer is formed, which is based on Palm Porometer measurement, is 0.1 μm or more and 10 μm or less.

As described above, in the exhaust gas purifying catalyst disclosed herein, the pore diameter of the partition wall in the inlet-side region is reduced to prevent PM from penetrating into the inside of the partition wall by providing the inlet-side catalyst layer. In this case, the pore diameter of the partition wall in the inlet-side region is preferably adjusted appropriately in consideration of the particle size of PM contained in the exhaust gas to be purified, and it is preferable to set the pore diameter within a range of, for example, 0.1 μm or more and 10 μm or less.

In a preferred embodiment of the exhaust gas purifying catalyst disclosed herein, the average pore diameter of the region where the outlet-side catalyst layer is formed, which is based on Palm Porometer measurement, is 12 μm or more and 20 μm or less.

As described above, in the exhaust gas purifying catalyst disclosed herein, NOx is mainly purified in the outlet-side catalyst layer. Therefore, it is preferable that the pore diameter of the partition wall in the outlet-side region where the outlet-side catalyst layer is formed be such that the exhaust gas with a sufficient flow rate could pass therethrough. From this viewpoint, it is preferable that the average pore diameter of the outlet-side region be in the range of, for example, 12 μm or more and 20 μm or less.

In a preferred embodiment of the exhaust gas purifying catalyst disclosed herein, the total amount of the SCR catalyst body present in the inlet-side catalyst layer and the outlet-side catalyst layer, when the volume of the base is 1 L, is 50 g or more and 150 g or less.

In the case where the exhaust gas purifying catalyst disclosed herein is used in an SCR type purification device, it is preferable to adjust the total amount of the SCR catalyst body present inside the partition wall in consideration of the content of NOx in the exhaust gas discharged from the internal combustion engine. For example, in order to appropriately purify NOx contained in the exhaust gas of a general diesel engine by using an exhaust gas purifying catalyst having a volume of the base (the total volume of the inlet-side cells and the outlet-side cells) of 1 L, it is preferable to set the total amount of the SCR catalyst body present in the inlet-side catalyst layer and the outlet-side catalyst layer to 50 g or more and 150 g or less.

In a preferred embodiment of the exhaust gas purifying catalyst disclosed herein, the SCR catalyst body is made mainly of a zeolite.

Such a SCR catalytic body made mainly of a zeolite can suitably hydrolyze the reducing agent mixed in the exhaust gas and advantageously generate ammonia ($NH_3$) which reacts with NOx, thereby making it possible to increase the purification efficiency of NOx.

In a preferred embodiment of the exhaust gas purifying catalyst disclosed herein, the zeolite is a zeolite of at least one kind selected from the group of skeleton type codes consisting of AEI, AFT, AFX, AST, BEA, BEC, CHA, EAB, ETR, GME, ITE, KFI, LEV, PAU, SAS, SAT, SAV, THO, and UFI which are defined by the International Zeolite Association.

In the case of using an SCR catalyst body made mainly of a zeolite, as in the above embodiment, it is preferable to use a zeolite of the above skeleton type codes as such a zeolite. Since these zeolites have a small pore diameter and are unlikely to be affected by hydrocarbons, NOx can be purified with high efficiency.

In a preferred embodiment of the exhaust gas purifying catalyst disclosed herein, the base of the wall flow structure is constituted by any selected from cordierite, silicon carbide, and aluminum titanate.

From the viewpoint of preventing the base from being damaged by the increase in temperature occurring when the internal combustion engine is operated under a high-load condition, it is preferable that the material of the base of the exhaust gas purifying catalyst be a heat-resistant material such as cordierite, silicon carbide and aluminum titanate.

In a preferred embodiment of the exhaust gas purifying catalyst disclosed herein, the reducing agent is urea.

In addition, urea is preferably used as the reducing agent to be mixed with the exhaust gas in the exhaust gas purifying catalyst. Urea can be advantageously used as a reducing agent because urea is easily decomposed by heat to generate ammonia, and NOx can be purified by the reaction of the ammonia with NOx.

BRIEF DESCRIPTION OF THE DRAWINGS

FIG. 1 is a view schematically showing an SCR type purification device including an exhaust gas purifying catalyst according to an embodiment of the present invention;

FIG. 2 is a perspective view schematically showing an exhaust gas purifying catalyst according to an embodiment of the present invention;

FIG. 3 is a diagram schematically showing the cross-sectional structure of the exhaust gas purifying catalyst shown in FIG. 2;

FIG. 4 is a cross-sectional view schematically showing a structure inside the partition wall of an exhaust gas purifying catalyst according to an embodiment of the present invention;

FIG. 5 is an enlarged sectional view schematically showing a partition wall in which an inlet-side catalyst layer is formed in the exhaust gas purifying catalyst according to an embodiment of the present invention;

FIG. 6 is a cross-sectional view schematically showing the inside of a partition wall of another example of an exhaust gas purifying catalyst including an inlet-side catalyst layer and an outlet-side catalyst layer; and FIG. 7 is a cross-sectional view schematically showing the inside of the partition wall of the exhaust gas purifying catalyst of Test Example 6.

DETAILED DESCRIPTION OF THE INVENTION

Hereinafter, preferred embodiments of the present invention will be described with reference to the drawings. In the following drawings, the same reference numerals are assigned to the members and parts that exhibit the same action, and redundant explanation may be omitted or simplified. In addition, the dimensional relationship (length, width, thickness, etc.) in the drawings does not necessarily reflect the actual dimensional relationship. Incidentally, matters other than matters particularly mentioned in the present specification and necessary for the implementation of the present invention can be understood as design matters for a person skilled in the art which are based on the related art in the relevant field. The present invention can be implemented based on the contents disclosed in this description and technical knowledge in the relevant field.

1. SCR Type Purification Device

First, an SCR type purification device provided with the exhaust gas purifying catalyst according to the present embodiment will be described with reference to FIG. 1. An SCR type purification device 100 shown in FIG. 1 is arranged so that exhaust gas is supplied from the left side to the right side in the drawing.

The SCR type purification device 100 shown in FIG. 1 is disposed in an exhaust pipe 50 of an internal combustion engine (not shown) and includes three kinds of exhaust gas purifying catalysts, namely, first to third exhaust gas purifying catalysts 10 to 30.

Each of the first to third exhaust gas purifying catalysts 10 to 30 includes a base having a honeycomb structure and a catalyst layer formed inside the base, and is configured to purify harmful components (PM, HC, CO, NOx) contained in the exhaust gas by allowing the exhaust gas to pass through the cells (flow paths) inside the base.

For example, the first exhaust gas purifying catalyst 10 disposed on the upstreammost side in the exhaust gas supply direction is provided with a diesel oxidation catalyst (DOC) for purifying unburned components (HC, CO) in the exhaust gas, or an NOx occlusion reduction catalyst (NSR) that occludes NOx under lean conditions and reduces and purifies it under rich conditions.

Further, an SCR catalyst body is used for the second exhaust gas purifying catalyst 20. A reducing agent supply unit 40 is provided upstream of the second exhaust gas purifying catalyst 20, and a mist reducing agent and the exhaust gas are mixed by supplying the reducing agent (such as urea) from the reducing agent supply unit 40. When the exhaust gas including the reducing agent passes through the second exhaust gas purifying catalyst 20, the reducing agent and NOx react with each under the effect of the catalyst body supported inside the catalyst, whereby NOx is purified.

The third exhaust gas-purifying catalyst 30 disposed on the downstreammost side is provided with the same SCR catalyst body as that of the second exhaust gas-purifying catalyst 20 and an ASC catalyst. The ASC catalyst is provided to prevent the reducing agent added to the exhaust gas from being discharged to the outside and includes a catalyst body that oxidizes and purifies the remaining reducing agent which has not reacted under the effect of the SCR catalyst body.

The exhaust gas purifying catalyst according to the present embodiment is an SCR catalyst body in which the SCR catalyst body is included in the catalyst layer, and it is particularly preferable that such a catalyst be used for the second exhaust gas purifying catalyst 20 among the first to third exhaust gas purifying catalysts 10 to 30. As will be described in detail later, the exhaust gas purifying catalyst according to the present embodiment can prevent the pores of the partition walls of the base from being clogged by PM, thereby making it possible to suppress a significant increase in pressure loss and maintain a high NOx purification rate. Therefore, such a catalyst can be advantageously used for the second exhaust gas purifying catalyst 20 into which PM and NOx need to be introduced at the same time.

2. Exhaust Gas Purifying Catalyst

Hereinafter, the exhaust gas purifying catalyst according to the present embodiment will be specifically described.

FIG. 2 is a perspective view schematically showing the exhaust gas purifying catalyst according to this embodiment, and FIG. 3 is a view schematically showing a cross-sectional structure of the exhaust gas purifying catalyst shown in FIG. 2. The exhaust gas purifying catalyst 20 includes a base 1 and a catalyst layer (not shown) formed on the partition wall inside the base 1.

(1) Base

As shown in FIG. 2, the base 1 has a honeycomb structure having a cylindrical outer shape. As shown in FIG. 3, the base 1 having such a honeycomb structure includes a plurality of cells (flow paths) 2a, 2b extending along the cylinder axis direction X of the base 1, and partition walls 4 partitioning the cells 2a, 2b. The outer shape of the entire base 1 is not limited to a cylindrical shape such as shown in FIG. 2, and may be an elliptic cylindrical shape, a polygonal cylindrical shape, or the like.

Further, the base 1 of the exhaust gas purifying catalyst 20 according to the present embodiment has a wall flow structure. The base 1 having such a wall flow structure has inlet-side cells 2a where only an end portion 1a on the exhaust gas inflow side is open and an end portion 1b on the exhaust gas outflow side is sealed with a sealing member 3a, and outlet-side cells 2b where only the end portion 1b on the exhaust gas outflow side is open and the end portion 1a on the exhaust gas inflow side is sealed with a sealing member 3b. In addition, the inlet-side cells 2a and the outlet-side cells 2b are formed adjacent to each other, and are formed as a whole in a checkered pattern such as shown in FIG. 2.

Further, the partition wall 4 that partitions the inlet-side cell 2a and the outlet-side cell 2b described above extends along the cylinder axis direction X of the base 1, that is, in the present embodiment, the "extension direction of the partition wall 4" is substantially the same as the cylinder axis direction X of the base 1. The partition wall 4 has a porous structure in which a plurality of pores through which the exhaust gas can pass are formed. As shown by arrows in FIG. 3, the exhaust gas supplied from the inlet-side cells 2a into the base 1 passes through the porous partition walls 4 and is discharged from the outlet-side cells 2b to the outside of the base 1. The average pore diameter of the pores of the partition wall 4 is set within a range of, for example, 10 µm or more and 40 µm or less. In this description, "the average pore diameter" is measured by a bubble point method using a Palm Porometer.

From the viewpoint of durability and gas permeability of the base 1, the thickness T of the partition wall 4 (that is, the average thickness from the surface in contact with the inlet-side cell 2a to the surface in contact with the outlet-side cell 2b) is preferably set within a range of 0.1 mm or more and 0.4 mm or less. Further, the total length Lw of the partition wall 4 in the extension direction X is preferably usually set within a range of 10 mm to 500 mm (for example, 50 mm to 300 mm). The volume of the entire base 1 (the total volume of the inlet-side cells 2a and the outlet-side cells 2b) is usually set to 1 L to 10 L (preferably 2 L to 8 L).

Various materials that can be used as a base of a general exhaust gas purifying catalyst can be used for the base 1. Preferable examples of the material of the base 1 include ceramics such as cordierite, silicon carbide (SiC), aluminum titanate, and alloys such as stainless steel. Since these materials have high heat resistance, even when the internal combustion engine is operated under a high-load condition and the exhaust gas purifying catalyst is exposed to a high temperature environment (for example, 400° C. or higher), the base can be prevented from being damaged by such rise in temperature.

(2) Catalyst Layer

As described above, the catalyst layer of the exhaust gas purifying catalyst according to the present embodiment is formed inside the partition wall 4 of the base 1. FIG. 4 is a cross-sectional view schematically showing the structure inside the partition wall of the base of the exhaust gas purifying catalyst according to this embodiment. As shown in FIG. 4, in the exhaust gas purifying catalyst 20 according to the present embodiment, two types of catalyst layers, namely, an inlet-side catalyst layer 6a and an outlet-side catalyst layer 6b, are formed inside the partition wall 4 of the base 1.

The inlet-side catalyst layer 6a and the outlet-side catalyst layer 6b include an SCR catalyst body of a substance that adsorbs the reducing agent mixed with the exhaust gas to purify NOx. Specifically, when urea is used as the reducing agent, the urea is hydrolyzed to generate ammonia ($NH_3$), and the ammonia and NOx react with each other, whereby NOx in the exhaust gas is purified.

For example, a catalyst body made mainly of a zeolite can be used for such an SCR catalytic body. Such a catalyst made mainly of a zeolite can be exemplified by a transition metal ion-exchanged zeolite in which a transition metal such as copper (Cu) or iron (Fe) is supported on a zeolite.

In the case of using such an SCR catalyst body mainly made of a zeolite, the zeolite is preferably a zeolite of at least one kind selected from the group of skeleton type codes consisting of AEI, AFT, AFX, AST, BEA, BEC, CHA, EAB, ETR, GME, ITE, KFI, LEV, PAU, SAS, SAT, SAV, THO, and UFI which are defined by the International Zeolite Association. Since these zeolites have a small pore diameter and are unlikely to be affected by hydrocarbons, NOx can be purified with high efficiency.

In order to appropriately purify NOx in the exhaust gas, it is preferable to adjust the total amount of the SCR catalyst body present in the inlet-side catalyst layer 6a and the outlet-side catalyst layer 6b in consideration of the NOx discharge amount from the internal combustion engine. For example, in order to adequately purify the exhaust gas of a diesel engine having a general displacement of about 2 L by using the base 1 having a capacity of 2 L, the total amount of the SCR catalyst body present in the inlet-side catalyst layer 6a and the outlet-side catalyst layer 6b is preferably 50 g or more and 150 g or less.

Next, each of the inlet-side catalyst layer 6a and the outlet-side catalyst layer 6b will be specifically described.

(a) Inlet-Side Catalyst Layer

As shown in FIG. 4, the inlet-side catalyst layer 6a is formed with a predetermined thickness T1 on the inner side of the partition wall 4 from the surface 4a of the partition wall 4 in contact with the inlet-side cell 2a and with a predetermined length L1 along the extension direction X of the partition wall 4 wall from the vicinity of the end portion 1a on the exhaust gas inflow side. As described above, in the present description, the region where the inlet-side catalyst layer 6a is formed is referred to as "inlet-side region".

In the inlet-side region, as shown in FIG. 5, the inlet-side catalyst layer 6a is formed so as to cover the surface 4a of the partition wall 4 in contact with the inlet-side cell 2a and also to cover side walls 7a of pores 7 of the partition wall 4. Therefore, in the inlet-side region where the inlet-side catalyst layer 6a is formed, the diameter of the pores 7 of the partition wall 4 is decreased, so that PM does not easily enter the inside of the partition wall 4.

The average pore diameter of the pores 7 in the inlet-side region is preferably 0.1 μm or more and 10 μm or less. As a result, PM can be reliably prevented from entering the inside of the partition wall 4.

As described hereinabove, in the exhaust gas-purifying catalyst 20 according to the present embodiment, the inlet-side catalyst layer 6a is formed with a predetermined length L1 along the extension direction X of the partition wall 4 from the vicinity of the end portion 1a on the exhaust gas inflow side. In the case of a general exhaust gas purifying catalyst of wall flow type 20, the exhaust gas including a large amount of PM easily pass through the partition wall 4 in the vicinity of the end portion 1a on the exhaust gas inflow side. Therefore, by forming the inlet-side catalyst layer 6a in the inlet-side region including the vicinity of the end portion 1a on the exhaust gas inflow side, it is possible to advantageously suppress the occurrence of a significant pressure loss increase due to PM entering the inside of the partition wall.

(b) Outlet-Side Catalyst Layer

As shown in FIG. 4, the outlet-side catalyst layer 6b is formed with a predetermined thickness T2 on the inner side of the partition wall 4 from the surface 4b of the partition wall 4 in contact with the outlet-side cell 2b, and is formed with a predetermined length L2 along the extension direction X of the partition wall 4 from the vicinity of the end portion 1b on the exhaust gas outflow side. As described above, in this description, the region where such outlet-side catalyst layer 6b is formed is referred to as "outlet-side region".

Since the inlet-side catalyst layer 6a is formed in the partition wall 4 in the inlet-side region as described above, the diameter of the pores 7 is decreased, and PM is likely to be trapped on the surface of the partition wall 4. The resultant problem is that while it is possible, in the inlet-side catalyst layer 6a, to suppress a significant increase in pressure loss due to PM entering the inside of the partition wall 4, the gas diffusivity in the inlet-side region is reduced by the trapped PM and the NOx purification rate is likely to decrease.

Meanwhile, in the exhaust gas purifying catalyst 20 according to the present embodiment, the total amount of the SCR catalyst body present in the outlet-side catalyst layer 6b formed in the outlet-side region is made larger than that in the inlet-side catalyst layer 6a, so that a high NOx purification rate in the exhaust gas purifying catalyst as a whole could be maintained. In this way, by including a large amount of SCR catalyst body in the catalyst layer (outlet-side catalyst layer 6b) in the outlet-side region so that NOx could be purified with high efficiency in the outlet-side catalyst layer 6b, it is possible to maintain a high NOx purification rate of the exhaust gas purifying catalyst as a whole.

The specific value of the total amount of the SCR catalyst body present in the outlet-side catalyst layer 6b is not particularly limited as it can be appropriately changed according to the capacity of the base 1 or the like, but when the total amount the SCR catalyst body present inside the partition wall 4 is 100% by weight, it is preferable that the SCR catalyst body present in the outlet-side catalyst layer 6b take 60% by weight or more and 80% by weight or less. This makes it possible to reliably maintain a state with a high NOx purification rate of the exhaust gas purifying catalyst as a whole.

As described above, in this embodiment, since the outlet-side catalyst layer 6b is a main site for NOx purification, it is preferable to adjust the pore diameter of the partition wall 4 in the outlet-side region so that exhaust gas with a sufficient flow rate could be passed through the outlet-side region where the outlet-side catalyst layer 6b is formed. It is preferable that the average pore diameter of the partition wall 4 in the outlet-side region be, for example, 12 μm or more and 20 μm or less.

As described above, according to the present embodiment, by providing the inlet-side catalyst layer 6a in the partition wall of the inlet-side region through which the exhaust gas including a large amount of PM can easily pass and trapping the PM on the surface 4a of the partition wall 4 in the inlet-side region, it is possible to suppress the increase in pressure loss caused by the PM entering the inside of the partition wall 4. Further, by providing the outlet-side catalyst layer 6b in which a large amount of the SCR catalyst body is present in the outlet-side region through which the exhaust gas having a relatively small content of PM passes thereby making the outlet-side region a main NOx purification site, it is possible to maintain a state with a high NOx purification rate.

In the exhaust gas purifying catalyst 20 according to the present embodiment, as shown in FIG. 4, the inlet-side catalyst layer 6a and the outlet-side catalyst layer 6b are formed with a predetermined length along the extension direction X of the partition wall 4, but in order to appropriately purify the NOx in the exhaust gas, the sum of the length L1 of the inlet-side catalyst layer 6a and the length L2 of the outlet-side catalyst layer 6b in the extension direction X of the partition wall 4 needs to be made larger than the total length Lw of the partition wall 4 in in the extension direction X.

Specifically, when the sum of the length L1 of the inlet-side catalyst layer 6a and the length L2 of the outlet-side catalyst layer 6b is less than the total length Lw of the partition wall 4, as shown in FIG. 6, a catalyst non-formation region 8 is formed between the inlet-side catalyst layer 6a and the outlet-side catalyst layer 6b. When the exhaust gas is supplied to the catalyst non-formation region 8, the exhaust gas is discharged to the outside of the catalyst without contacting the SCR catalyst body, and the NOx purification rate may be greatly lowered. Therefore, in the exhaust gas purifying catalyst 20 according to the present embodiment, as shown in FIG. 4, the sum of the length L1 of the inlet-side catalyst layer 6a and the length L2 of the outlet-side catalyst layer 6b is made larger than the total length Lw of the partition wall 4 so that the catalyst non-formation region 8 is not formed.

(c) Various Modes Related to the Catalyst Layer

As described above, the exhaust gas purifying catalyst 20 according to the present embodiment is configured so that the total amount of the SCR catalyst body present in the outlet-side catalyst layer 6b is larger than that in the inlet-side catalyst layer 6a. Various means can be used to adjust the total amount of SCR catalyst body in the outlet-side catalyst layer 6b and the inlet-side catalyst layer 6a.

For example, adjusting the thicknesses T1, T2 of the respective catalyst layers is an example of means for adjusting the total amount of the SCR catalyst body in the catalyst layers.

Specifically, when the densities of the SCR catalyst body included in the respective catalyst layers are the same, the total amount of the SCR catalyst body in the outlet-side catalyst layer 6b can be made larger than that in the inlet-side catalyst layer 6a by increasing the thickness T2 of the outlet-side catalyst layer 6b over the thickness T1 of the inlet-side catalyst layer 6a. In the case of adjusting the total amount of the SCR catalyst body according to the thicknesses T1 and T2 of the catalyst layers in the above-described manner, it is preferable that the thickness T1 of the outlet-side catalyst layer 6b be 50% or more and 80% or less and the thickness T2 of the inlet-side catalyst layer 6a be 20% or more and 50% or less when the thickness T of the partition wall 4 is 100%.

Further, adjusting the lengths L1, L2 of the respective catalyst layers is another example of means for adjusting the total amount of the SCR catalyst body in the catalyst layers.

Specifically, when the densities of the SCR catalyst body included in the respective catalyst layers are the same, the total amount of the SCR catalyst body in the outlet-side catalyst layer 6b can be made larger than that in the inlet-side catalyst layer 6a also in the case in which the length L2 of the outlet-side catalyst layer 6b is made larger than the length L1 of the inlet-side catalyst layer 6a. In the case of adjusting the total amount of the SCR catalyst body according to the lengths L1 and L2 of the catalyst layers in the above-described manner, it is preferable that the length L2 of the outlet-side catalyst layer 6b be 60% or more and 95% or less and the length L1 of the inlet-side catalyst layer 6a be 10% or more and 50% or less when the total length Lw of the partition wall 4 in the extension direction is 100%.

As described above, when the dimensions such as the thickness and length of each catalyst layer 6a, 6b are specified, it is preferable that the dimension of the region in which 80% of the SCR catalyst body used for forming the inlet-side catalyst layer 6a (or the outlet-side catalyst layer 6b) is present be regarded as the dimension of the inlet-side catalyst layer 6a (or the outlet-side catalyst layer 6b). The SCR catalyst body present in such a catalyst layer can be examined by capturing an image of the cross section of the partition wall by SEM observations (or EPMA observations), and then extracting only the SCR catalyst body by image processing. Further, the presence ratio of the SCR catalyst body can be obtained from the ratio of the area of the extracted SCR catalyst body to the area of the inlet-side catalyst layer (or the outlet-side catalyst layer). Then, the area of the whole observation field of view can be integrated, and the dimension of the region with the 80% presence from the surface of each of the inlet-side catalyst layer and the outlet-side catalyst layer can be the thickness of the catalyst layer.

This is done so because depending on the viscosity of the catalyst forming slurry used to form each catalyst layer and the material of the partition wall 4 of the base 1, the inlet-side catalyst layer 6a (or the outlet-side catalyst layer 6b) in which the content of the SCR catalyst body gradually decreases toward the catalyst non-formation region 8 may be formed or the inlet-side catalyst layer 6a (or the outlet-side catalyst layer 6b) in which part of the SCR catalyst body protrudes to the outside may be formed, so that the boundary between the inlet-side catalyst layer 6a (or the outlet-side catalyst layer 6b) and the catalyst non-formation region 8 may become unclear.

In each of the above modes, the total amount of the SCR catalyst body present in each catalyst layer is adjusted by adjusting the dimension (thickness and length) of each catalyst layer. However, this method for adjusting the total amount of SCR catalyst body present in each catalyst layer is not limiting. For example, even when the dimensions of the inlet-side catalyst layer 6a and the outlet-side catalyst layer 6b are the same, the total amount of the SCR catalyst body in the outlet-side catalyst layer 6b can be made larger than that in the inlet-side catalyst layer 6a by making the content of the SCR catalyst body (density of the SCR catalyst body) per unit volume in the outlet-side catalyst layer 6b larger than that in the inlet-side catalyst layer 6a.

3. Production Method

Next, an example of a method for producing the exhaust gas purifying catalyst according to the abovementioned embodiment will be described. The following description is not intended to limit the exhaust gas purifying catalyst disclosed herein.

Here, first, the base 1 having a wall flow structure such as shown in FIGS. 2 and 3 is prepared, and a raw material slurry including the SCR catalyst body is prepared. Such a raw material slurry is prepared by mixing an SCR catalyst body (typically, a transition metal ion exchanged zeolite) which is an essential ingredient and other optional components (for example, an auxiliary catalyst, a binder, and the like) in a solvent such as water. At this time, the concentration of the SCR catalyst body in the raw material slurry may be adjusted according to the catalyst layer to be formed.

Next, in this production method, the inlet-side catalyst layer 6a is formed in the inlet-side region of the partition wall 4 of the base 1. Specifically, the raw slurry is introduced into the inlet-side cell 2a from the end portion 1a on the exhaust gas inflow side of the base 1 by air blowing. As a result, the raw material slurry permeates into the inside of the porous partition wall 4. After that, the base 1 is heated at a predetermined temperature to dry and calcine the slurry, whereby the inlet-side catalyst layer 6a is formed inside the partition wall 4 in the inlet-side region. At this time, it is possible to adjust the length L1 or the thickness T1 (see FIG. 4) of the formed inlet-side catalyst layer 6a by adjusting the amount of the raw slurry to be introduced, or the pressure and flow rate of air blowing.

Next, the outlet-side catalyst layer 6b is formed in the outlet-side region of the partition wall 4 of the base 1. The method for forming the outlet-side catalyst layer 6b is basically the same as the above-described method for forming the inlet-side catalyst layer 6a.

That is, after the raw slurry is introduced into the outlet-side cell 2b from the end portion 1b on the exhaust gas outflow side of the base 1 and the raw material slurry is caused to permeate into the inside of the partition wall 4 in the outlet-side region, the base 1 is heated at a predetermined temperature to dry and calcine the slurry. In the formation of the outlet-side catalyst layer 6b, the length L2 and the thickness T2 of the formed outlet-side catalyst layer 6b can be adjusted by adjusting the amount of the slurry and the air blowing conditions.

As described above, in this production method, after introducing the raw slurry from the end portion 1a on the exhaust gas inflow side to form the inlet-side catalyst layer 6a, the raw slurry is introduced from the end portion 1b on the exhaust gas outflow side to form the outlet-side catalyst layer 6b. At this time, by adjusting various conditions such as the amount and composition of the raw material slurry and the air blowing condition, it is possible to produce the exhaust gas purifying catalyst 20 in which the total amount of SCR catalyst body in the outlet-side catalyst layer 6b is larger than that in the inlet-side catalyst layer 6a.

Although the exhaust gas purifying catalyst according to an embodiment of the present invention has been described above, the present invention is not limited to the above-described embodiments and can be appropriately changed. For example, it is preferable that the dimensions of the inlet-side catalyst layer 6a and the outlet-side catalyst layer 6b, the content of the SCR catalyst body, and the like, be appropriately adjusted in advance in consideration of the composition of the exhaust gas to be purified, the dimensions of the base, and the like, by performing tests.

TEST EXAMPLES

Hereinafter, test examples relating to the present invention will be described, but the following description is not intended to limit the present invention.

Experiment A

In Experiment A, the inlet-side catalyst layer and the outlet-side catalyst layer were formed inside the partition wall, and exhaust gas purifying catalysts that differed from each other in the length and thickness of the inlet-side catalyst layer and the outlet-side catalyst layer and the content of the SCR catalyst body were prepared (Test Examples 1 to 6). Then, the pressure loss and the NOx purification rate of each exhaust gas purifying catalyst were measured to investigate the exhaust gas purifying catalyst that makes it possible to appropriately suppress an increase in pressure loss and can exhibit a high NOx purification rate.

1. Preparation of Test Examples (1) Test Example 1

Prepared in Test Example 1 was the exhaust gas purifying catalyst 20 including, as shown in Table 1 described hereinbelow, the inlet-side catalyst layer 6a in which the length L1 in the extension direction X of the partition wall 4 was 40 mm, the thickness T1 was 50% of the average thickness T of the partition wall 4, the total amount of the SCR catalyst body was 45 g, and the average pore diameter was 8 μm, and the outlet-side catalyst layer 6b in which the length L2 was 80 mm, the thickness T2 was of 80% of the average thickness T of the partition wall 4, the total amount of the SCR catalyst body was 105 g, and the average pore diameter was 13 μm. A specific preparation procedure is described below.

First, SSZ-13, which is an alumina silicate of a CHA type zeolite, was dispersed in deionized water, and then copper acetate was added. Then, the dispersion was heated to 80° C. and stirred for 12 h, followed by filtration and washing, and the obtained solid matter was dried for 5 h at 200° C. to obtain a Cu ion-exchanged zeolite (supported amount of Cu was 3% by weight) which is the SCR catalyst body. Then, the Cu ion-exchanged zeolite (1,000 g), silica sol (500 g), and pure water (1,000 g) were mixed and stirred for 1 h in a ball mill to prepare a raw material slurry.

Next, the cylindrical base 1 (made of cordierite, diameter 160 mm, total length Lw of the partition wall 4 100 mm) having a wall flow structure such as shown in FIGS. 2 and 3 was prepared.

Then, the raw material slurry described above was weighed so that 45 g of the SCR catalyst body (Cu ion-exchanged zeolite) was included as a solid component, and the raw slurry was introduced into the inlet-side cell 2a and supplied into the partition wall 4 by air blowing from the end portion 1a on the gas inflow side. At this time, the air flow velocity and processing time were controlled to allow the raw material slurry to permeate into the region of 40 mm in the extension direction X from the end portion 1a on the gas inflow side and 50% in the thickness direction from the surface 4a of the partition wall 4 in contact with the inlet-side cell 2a.

Then, the base 1 into which the raw material slurry had permeated was dried for 60 min at 100° C. and then heat-treated for 30 min at 500° C., thereby forming the inlet-side catalyst layer 6a in which the length L1 was 40 mm, the thickness T1 was 50% of the thickness T of the partition wall 4, and 45 g of the SCR catalyst body was present.

Then, the raw material slurry described above was weighed so that 105 g of the SCR catalyst body (Cu ion-exchanged zeolite) was included as a solid component, and the raw slurry was introduced into the outlet-side cell 2b and supplied into the partition wall 4 by air blowing from the end portion 1b on the gas outflow side. The base was then dried and heat treated under the same conditions as described hereinabove to form the outlet-side catalyst layer 6b. In forming the outlet-side catalyst layer 6b, the conditions of air blowing were adjusted to form the outlet-side catalyst layer 6b in which the length L2 in the extension direction X of the partition wall 4 was 80 mm, the thickness T2 was 80% of the thickness T of the partition wall 4, and 105 g of the SCR catalytic body was present.

(2) Test Examples 2 to 5

In Test Examples 2 to 5, exhaust gas purifying catalysts having different dimensions of the catalyst layers and different contents of the SCR catalyst body therein, such as shown in Table 1, were prepared by adjusting the introduced amount of the raw material slurry and the air blowing conditions when forming the inlet-side catalyst layer 6a and the outlet-side catalyst layer 6b. In preparing the exhaust gas purifying catalysts of Test Examples 2 to 5, various production conditions other than the conditions shown in Table 1 were set to be the same as in Test Example 1.

(3) Test Example 6

In Test Example 6, an exhaust gas purifying catalyst in which a uniform catalyst layer 6 was formed in all regions inside the partition wall 4 of the base 1 as shown in FIG. 7 was prepared as a comparison example. The total amount of the SCR catalyst body present in the catalyst layer 6 of Test Example 6 was set to 150 g which was the same amount as the sum of the amounts of the SCR catalyst body present in each of the inlet-side catalyst layer and the outlet-side catalyst layer in Test Examples 1 to 5 described hereinabove.

2. Evaluation Tests

In the present experiment, the average pore diameter of the partition wall in the region where each catalyst layer was formed, the pressure loss of the exhaust gas purifying catalyst, and the NOx purification rate were measured as evaluation tests for evaluating the exhaust gas purifying catalyst prepared in each test example. Specific measurement methods will be described below.

(1) Measurement of Average Pore Diameter

The average pore diameter of the inlet-side region and the average pore diameter of the outlet-side region were measured with respect to the exhaust gas purifying catalyst of each test example.

Specifically, a partition wall 4 at a position of 20 mm along the extension direction X of the partition wall 4 from the end portion 1a on the gas inflow side of the prepared exhaust gas purifying catalyst was cut out, the average pore diameter of the cut-out partition wall 4 was measured by performing fine pore diameter measurement (bubble point method) based on gas permeation using a Palm Porometer and the measurement result was the average pore diameter (μm) in the inlet-side region.

Further, a partition wall 4 at a position of 20 mm along the extension direction X of the partition wall 4 from the end portion 1b on the gas outflow side of the exhaust gas purifying catalyst 20 was cut out, the average pore diameter of the partition wall 4 was measured by the same procedure as described hereinabove, and the measurement result was the average pore diameter (μm) in the outlet-side region.

(2) Measurement of Pressure Loss

The prepared exhaust gas purifying catalyst was placed in the exhaust pipe of an internal combustion engine, the internal combustion engine was operated for a certain period of time, the exhaust gas was passed through the exhaust gas purifying catalyst, the pressure on the downstream side of the exhaust gas purifying catalyst was measured, and a loss of pressure (pressure loss) was calculated.

Specifically, a 2.2 L common rail type diesel engine was used as the internal combustion engine, the internal combustion engine was operated for a predetermined time at a revolution speed of 2,000 rpm, and the difference in pressure between the zones upstream and downstream of the exhaust gas purifying catalyst was measured. Experiments conducted in advance have demonstrated that in the diesel engine used, 5 g of PM is discharged when the engine is operated at a revolution speed of 2,000 rpm. Further, the pressure loss (KPa) in each exhaust gas purifying catalyst was calculated based on the pressure on the downstream side of the base when the exhaust gas of the diesel engine was passed through the base on which the catalyst layer was not formed.

(3) Measurement of NOx Purification Rate

The exhaust gas purifying catalyst of each test example was placed in the exhaust pipe of the internal combustion engine, and the internal combustion engine was operated for a certain period of time to measure the NOx purification rate.

Specifically, the 2.2 L common rail type diesel engine used for measuring the pressure loss was used as the internal combustion engine, a DOC catalyst was placed in the exhaust pipe of the diesel engine, and the exhaust gas purifying catalyst of each test example was placed downstream of the DOC catalyst.

Then, misty urea was added to the exhaust gas on the upstream side of the exhaust gas purifying catalyst of each test example, and the exhaust gas mixed with the urea was supplied to the exhaust gas purifying catalyst, whereby NOx in the exhaust gas was purified. The addition amount of the urea at this time was adjusted so that when the urea became ammonia ($NH_3$) under the effect of the SCR catalyst body, the weight ratio of the ammonia to NOx became 1:1.

Then, purification of NOx was performed while maintaining the temperature of the exhaust gas purifying catalyst at 300° C., the NOx concentration of the exhaust gas before the exhaust gas was supplied to the exhaust gas purifying catalyst (the NOx concentration of the gas entering the catalyst) and the NOx concentration of the exhaust gas discharged from the exhaust gas purifying catalyst (the NOx concentration of the gas exiting the catalyst) were measured, and the NOx purification rate of each exhaust gas purifying catalyst was calculated based on the measurement result and the following calculating formula.

NOx purification rate (%)={[(NOx concentration of the gas entering the catalyst (ppm))−(NOx concentration of the gas exiting the catalyst (ppm))]/(NOx concentration of the gas entering the catalyst (ppm))}×100

The results of each of the above-described evaluation tests are shown in Table 1.

TABLE 1

| | Inlet-side catalyst layer | | | | Outlet-side catalyst layer | | | | Pressure loss (KPa) | NOx purification ratio (%) |
|---|---|---|---|---|---|---|---|---|---|---|
| | Length (mm) | Thickness (%) | Catalyst amount (g) | Pore diameter (μm) | Length (mm) | Thickness (%) | Catalyst amount (g) | Pore diameter (μm) | | |
| Example 1 | 40 | 50 | 45 | 8 | 80 | 80 | 105 | 13 | 3.2 | 85 |
| Example 2 | 50 | 50 | 30 | 10 | 95 | 80 | 120 | 12 | 3.8 | 84 |
| Example 3 | 25 | 50 | 45 | 9 | 65 | 80 | 105 | 13 | 3.2 | 60 |
| Example 4 | 40 | 50 | 75 | 5 | 60 | 80 | 75 | 21 | 4.1 | 69 |
| Example 5 | 30 | 20 | 75 | 0 | 70 | 80 | 75 | 21 | 4.5 | 65 |
| Example 6 | 100 | 100 | 150 | 15 | — | | | | 9.5 | 83 |

As shown in Table 1, when comparing the pressure losses of the exhaust gas purifying catalysts of the test examples, the exhaust gas purifying catalysts of Test Examples 1 to 5 in which the two catalyst layers, namely, the inlet-side catalyst layer and the outlet-side catalyst layer, were formed, exhibited significant reduction in pressure loss as compared with Test Example 6 in which a uniform catalyst layer was formed. From this, it can be seen that by forming two catalyst layers, namely, the inlet-side catalyst layer and the outlet-side catalyst layer, so that PM is trapped on the surface of the partition wall in the inlet-side region, it is possible to appropriately suppress the increase in pressure loss.

Meanwhile, when comparing the NOx purification rates of the test examples, the NOx purification rates of Test Examples 4 and 5 remarkably decreased from Test Example 6. This is because in the inlet-side catalyst layer, the NOx purification capability tends to decrease due to the PM trapped on the partition wall surface, and it is conceivable that in Test Examples 4 and 5, the NOx purification rate was greatly reduced because a large amount of the SCR catalyst body was present in such inlet-side catalyst layer.

In contrast, in Test Examples 1 and 2, no decrease in the NOx purification rate was observed. Therefore, it was confirmed that a high NOx purification rate of the exhaust gas purifying catalyst as a whole can be maintained by setting the total amount of the SCR catalyst body present in the outlet-side catalyst layer to be larger than that in the inlet-side catalyst layer and setting the outlet-side catalyst layer as the main NOx purification site.

Further, in the exhaust gas purifying catalyst of Test Example 3, the NOx purification rate was greatly reduced although the inlet-side catalyst layer 6a and the outlet-side catalyst layer 6b were formed and the total amount of the SCR catalyst body in the outlet-side catalyst layer 6b was larger than that in the inlet-side catalyst layer. This was apparently because in the exhaust gas purifying catalyst of Test Example 3, the sum of the length L1 (25 mm) of the inlet-side catalyst layer and the length L2 (65 mm) of the outlet-side catalyst layer was less than the total length Lw (100 mm) of the base 1, and therefore the catalyst non-formation region 8 was formed between the inlet-side catalyst layer 6a and the outlet-side catalyst layer 6b as shown in FIG. 6, and NOx in the exhaust gas passing through the catalyst non-formation region 8 was not purified.

Experiment B

Next, Experiment B was conducted in order to investigate the influence of the average pore diameter of the inlet-side catalyst layer on the pressure loss of the exhaust gas purifying catalyst.

1. Preparation of Test Examples
(1) Preparation of Test Examples

Exhaust gas purifying catalysts were prepared by adjusting various conditions so that the average pore diameter of the partition walls 4 in the inlet-side region differed among Test Examples 7 to 11 as shown in Table 2. In Test Examples 7 to 11, various production conditions other than the conditions shown in Table 1 were set to be the same as in Test Example 1 of Experiment A. Also in this experiment, the exhaust gas purifying catalyst of Test Example 6 was prepared under the same conditions as in Experiment A as a comparison target.

2. Evaluation Tests

The average pore diameter of the partition wall in the inlet-side region, the average pore diameter of the partition wall in the outlet-side region, the pressure loss of the exhaust gas purifying catalyst, and the NOx purification ratio were measured under the same conditions as in the above Experiment A. The results are shown in Table 2.

As shown in Table 2, it was confirmed that the pressure loss was significantly reduced in each of Test Examples 7 to 11 with respect to that in Test Example 6. Among these Test Examples 7 to 11, the pressure loss was particularly advantageously reduced in Test Examples 7 to 9. From this, it was found that the increase in pressure loss can be particularly advantageously reduced by setting the average pore diameter of the inlet-side catalyst layer to 0.1 μm or more and 10 μm or less.

Further, from the measurement result of the average pore diameter of the outlet-side catalyst layer, it was found that a sufficient NOx purification rate can be ensured when the average pore diameter of at least the outlet-side catalyst layer is within the range of 12 μm or more and 20 μm or less.

Experiment C

Next, Experiment C was performed in order to investigate the effect of the length L1 of the inlet-side catalyst layer 6a in the extension direction X of the partition wall 4 and the length L2 of the outlet-side catalyst layer 6b on the pressure loss and NOx purification rate.

In Experiment C, exhaust gas purifying catalysts of Test Examples 12 to 18 were prepared under the same conditions as in Test Example 1 of Experiment A, except that the conditions shown in Table 3 below were made different. Further, in each test example, the average pore diameter of the catalyst layer, the pressure loss, and the NOx purification rate were measured in the same manner as in Experiment A. The measurement results are shown in Table 3.

TABLE 2

| | Inlet-side catalyst layer | | | | Outlet-side catalyst layer | | | | Pressure loss (KPa) | NOx purification ratio (%) |
|---|---|---|---|---|---|---|---|---|---|---|
| | Length (mm) | Thickness (%) | Catalyst amount (g) | Pore diameter (μm) | Length (mm) | Thickness (%) | Catalyst amount (g) | Pore diameter (μm) | | |
| Example 7 | 40 | 20 | 60 | 0.1 | 80 | 80 | 90 | 20 | 3.5 | 83 |
| Example 8 | 40 | 50 | 60 | 8 | 80 | 80 | 90 | 20 | 3.5 | 83 |
| Example 9 | 40 | 50 | 30 | 10 | 80 | 80 | 120 | 12 | 3.8 | 84 |
| Example 10 | 40 | 60 | 45 | 11 | 80 | 80 | 105 | 13 | 5.5 | 84 |
| Example 11 | 50 | 50 | 15 | 12 | 95 | 80 | 135 | 14 | 6.6 | 80 |
| Example 6 | 100 | 100 | 150 | 15 | — | | | | 9.5 | 83 |

TABLE 3

| | Inlet-side catalyst layer | | | | Outlet-side catalyst layer | | | | Pressure loss (KPa) | NOx purification ratio (%) |
|---|---|---|---|---|---|---|---|---|---|---|
| | Length (mm) | Thickness (%) | Catalyst amount (g) | Pore diameter (μm) | Length (mm) | Thickness (%) | Catalyst amount (g) | Pore diameter (μm) | | |
| Example 12 | 20 | 50 | 45 | 9 | 80 | 80 | 105 | 13 | 3.3 | 76 |
| Example 13 | 40 | 50 | 45 | 8 | 60 | 80 | 105 | 13 | 3.5 | 85 |
| Example 14 | 40 | 50 | 45 | 8 | 70 | 80 | 105 | 13 | 3.3 | 84 |
| Example 15 | 50 | 50 | 45 | 10 | 95 | 80 | 105 | 13 | 3.4 | 84 |
| Example 16 | 30 | 50 | 45 | 8 | 80 | 80 | 105 | 13 | 3.1 | 86 |
| Example 17 | 10 | 50 | 15 | 5 | 95 | 80 | 135 | 12 | 3.6 | 87 |
| Example 18 | 50 | 50 | 60 | 9 | 60 | 80 | 90 | 12 | 3.4 | 86 |

As shown in Table 3, a certain decrease in the NOx purification rate was observed in Test Example 12. This was because in Test Example 12, the volume of the inlet-side catalyst layer was lower than that in the other test examples and the density of the SCR catalyst body in the inlet-side catalyst layer was high which resulted in the increase of the degree of decrease in the NOx purification rate caused by accumulation of PM in the inlet-side region.

Meanwhile, in Test Examples 13 to 18, advantageous results were obtained in terms of both the pressure loss and the NOx purification rate. These results have shown that an exhaust gas purifying catalyst exhibiting both the effect of suppressing the pressure loss and the effect of maintaining the NOx purification rate can be reliably obtained at least by setting the length L1 of the inlet-side catalyst layer 6a to 10 mm or more and 50 mm or less and the length L2 of the outlet-side catalyst layer 6b to 60 mm or more and 95 mm or less when the total length Lw in the extension direction X of the partition wall 4 is 100 mm.

Experiment D

Then, Experiment D was performed to investigate the influence of the thickness T1 of the inlet-side catalyst layer 6a and the thickness T2 of the outlet-side catalyst layer 6b on the pressure loss and NOx purification rate of the exhaust gas purifying catalyst. In Experiment D, the exhaust gas purifying catalyst of each test example was prepared under the same conditions as in Test Example 1 of Experiment A, except that the conditions shown in Table 4 below were made different.

Further, the average pore diameter of the inlet-side catalyst layer 6a and the outlet-side catalyst layer 6b, the pressure loss, and the NOx purification rate were measured under the same conditions as in Experiment A. The measurement results are shown in Table 4.

TABLE 4

| | Inlet-side catalyst layer | | | | Outlet-side catalyst layer | | | | Pressure loss (KPa) | NOx purification ratio (%) |
|---|---|---|---|---|---|---|---|---|---|---|
| | Length (mm) | Thickness (%) | Catalyst amount (g) | Pore diameter (μm) | Length (mm) | Thickness (%) | Catalyst amount (g) | Pore diameter (μm) | | |
| Example 19 | 40 | 50 | 45 | 8 | 80 | 80 | 105 | 13 | 3.2 | 85 |
| Example 20 | 40 | 20 | 45 | 8 | 80 | 80 | 105 | 13 | 3.3 | 83 |
| Example 21 | 40 | 50 | 45 | 8 | 80 | 50 | 105 | 13 | 3.2 | 85 |
| Example 22 | 40 | 20 | 45 | 8 | 80 | 50 | 105 | 13 | 3.4 | 84 |

As shown in Table 4, advantageous results were obtained in terms of both the pressure loss and the NOx purification rate in any of the test examples. These results show that an exhaust gas purifying catalyst exhibiting both the effect of suppressing the pressure loss and the effect of maintaining the NOx purification rate can be reliably obtained by setting the thickness T1 of the inlet-side catalyst layer 6a to 20% or more and 50% or less of the thickness T of the partition wall 4 and setting the thickness T2 of the outlet-side catalyst layer 6b to 50% or more and 80% or less of the thickness T of the partition wall 4.

Experiment E

Then, Experiment E was performed to investigate the preferred content of SCR catalyst body in each catalyst layer. In Experiment E, the exhaust gas purifying catalyst of each test example was prepared under the same conditions as in Test Example 1 of Experiment A, except that the conditions shown in Table 5 below were made different.

Further, the average pore diameter of the catalyst layers, the pressure loss, and the NOx purification rate of the exhaust gas purifying catalyst of each test example were measured under the same conditions as in Experiment A. The measurement results are shown in Table 5.

TABLE 5

|  | Inlet-side catalyst layer | | | | Outlet-side catalyst layer | | | | Pressure loss (KPa) | NOx purification ratio (%) |
| --- | --- | --- | --- | --- | --- | --- | --- | --- | --- | --- |
|  | Length (mm) | Thickness (%) | Catalyst amount (g) | Pore diameter (μm) | Length (mm) | Thickness (%) | Catalyst amount (g) | Pore diameter (μm) | | |
| Example 23 | 40 | 50 | 60 | 8 | 60 | 80 | 90 | 18 | 3.3 | 85 |
| Example 24 | 40 | 50 | 30 | 9 | 60 | 80 | 120 | 12 | 3.4 | 85 |
| Example 25 | 40 | 50 | 15 | 11 | 60 | 80 | 135 | 12 | 5.1 | 73 |

As shown in Table 5, advantageous results were obtained in terms of both the pressure loss and the NOx purification rate in any of the test examples. Further, in Test Examples 23 and 24, more advantageous results were obtained as compared with Test Example 24 in terms of both the pressure loss and the NOx purification rate. These results show that an exhaust gas purifying catalyst exhibiting both the effect of suppressing the pressure loss and the effect of maintaining the NOx purification rate can be reliably obtained by setting the SCR catalyst body present inside the outlet-side catalyst layer 6b to 60% by weight or more and 80% by weight or less (90 g or more and 120 g or less) when the total amount of the SCR catalyst body preset inside the partition wall is 100% (150 g).

Although specific examples of the present invention have been described in detail hereinabove, these are merely illustrative and do not limit the scope of the claims. Techniques described in the claims are inclusive of those in which the concrete examples exemplified above are variously modified and changed.

What is claimed is:

1. An exhaust gas purifying catalyst of wall flow type disposed in an exhaust pipe of an internal combustion engine and purifying exhaust gas discharged from the internal combustion engine by reacting the exhaust gas with a reducing agent, the exhaust gas purifying catalyst comprising:

a base of a wall flow structure having an inlet-side cell in which only an end portion on an exhaust gas inflow side is open, an outlet-side cell which is adjacent to the inlet-side cell and in which only an end portion on an exhaust gas outflow side is open, the base further having a porous partition wall partitioning the inlet-side cell and the outlet-side cell;

an inlet-side catalyst layer which is formed with a predetermined thickness on the inner side of the partition wall from the surface of the partition wall in contact with the inlet-side cell and which is formed with a predetermined length along an extension direction of the partition wall from the vicinity of the end portion on the exhaust gas inflow side, the inlet-side catalyst layer including an SCR catalyst of a substance which adsorbs the reducing agent and purifies NOx in the exhaust gas; and an outlet-side catalyst layer which is formed with a predetermined thickness on the inner side of the partition wall from the surface of the partition wall in contact with the outlet-side cell and which is formed with a predetermined length along an extension direction of the partition wall from the vicinity of the end portion on the exhaust gas outflow side, the outlet-side catalyst layer including an SCR catalyst of the substance, wherein a sum of the length of the inlet-side catalyst layer and the length of the outlet-side catalyst layer in the extension direction is larger than the entire length of the partition wall in the extension direction, and a total amount of the SCR catalyst body present in the outlet-side catalyst layer is larger than a total amount of the SCR catalyst body present in the inlet-side catalyst layer.

2. The exhaust gas purifying catalyst according to claim 1, wherein a thickness of the outlet-side catalyst layer is larger than a thickness of the inlet-side catalyst layer.

3. The exhaust gas purifying catalyst according to claim 2, wherein the thickness of the outlet-side catalyst layer is 50% or more and 80% or less and the thickness of the inlet-side catalyst layer is 20% or more and 50% or less when an average thickness of the partition wall from the surface in contact with the inlet-side cell to the surface in contact with the outlet-side cell is 100%.

4. The exhaust gas purifying catalyst according to claim 1, wherein the length of the outlet-side catalyst layer is larger than the length of the inlet-side catalyst layer in the extension direction.

5. The exhaust gas purifying catalyst according to claim 4, wherein the length of the outlet-side catalyst layer is 60% or more and 95% or less and the length of the inlet-side catalyst layer is 10% or more and 50% or less when the entire length of the partition wall in the extension direction is 100%.

6. The exhaust gas purifying catalyst according to claim 1, wherein a content of the SCR catalyst body per unit volume of the outlet-side catalyst layer is larger than a content of the SCR catalyst body per unit volume of the inlet-side catalyst layer.

7. The exhaust gas purifying catalyst according to claim 1, wherein the SCR catalyst body present in the outlet-side catalyst layer takes 60% by weight or more and 80% by weight or less when the total amount of the SCR catalyst body present inside the partition wall is 100% by weight.

8. The exhaust gas purifying catalyst according to claim 1, wherein an average pore diameter of a region where the inlet-side catalyst layer is formed, which is based on Palm Porometer measurement, is 0.1 μm or more and 10 μm or less.

9. The exhaust gas purifying catalyst according to claim 1, wherein an average pore diameter of a region where the outlet-side catalyst layer is formed, which is based on Palm Porometer measurement, is 12 μm or more and 20 μm or less.

10. The exhaust gas purifying catalyst according to claim 1, wherein the total amount of the SCR catalyst body present in the inlet-side catalyst layer and the outlet-side catalyst layer, when the volume of the base is 1 L, is 50 g or more and 150 g or less.

11. The exhaust gas purifying catalyst according to claim 1, wherein the SCR catalyst body is made mainly of a zeolite.

12. The exhaust gas purifying catalyst according to claim 11, wherein the zeolite is a zeolite of at least one kind selected from the group of skeleton type codes consisting of AEI, AFT, AFX, AST, BEA, BEC, CHA, EAB, ETR, GME, ITE, KFI, LEV, PAU, SAS, SAT, SAV, THO, and UFI, which are defined by the International Zeolite Association.

13. The exhaust gas purifying catalyst according to claim 1, wherein the base of the wall flow structure is constituted by any selected from cordierite, silicon carbide, and aluminum titanate.

14. The exhaust gas purifying catalyst according to claim 1, wherein the reducing agent is urea.

15. The exhaust gas purifying catalyst according to claim 1, wherein the porous partition wall partitioning the inlet-side cell and the outlet-side cell is configured to allow the exhaust gas to flow from the inlet-side cell to the outlet-side cell.

16. The exhaust gas purifying catalyst according to claim 1, wherein an average pore diameter of pores of the porous partition wall is in a range of 10 μm or more and 40 μm or less.

* * * * *